United States Patent
Hagen et al.

(10) Patent No.: US 10,445,007 B1
(45) Date of Patent: Oct. 15, 2019

(54) MULTI-CORE OPTIMIZED WARM-START LOADING APPROACH

(71) Applicant: Rockwell Collins, Inc., Cedar Rapids, IA (US)

(72) Inventors: John L. Hagen, Marion, IA (US); David J. Radack, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 11 days.

(21) Appl. No.: 15/491,758

(22) Filed: Apr. 19, 2017

(51) Int. Cl.
*G06F 3/06* (2006.01)
*G06F 9/4401* (2018.01)

(52) U.S. Cl.
CPC ............ *G06F 3/0619* (2013.01); *G06F 3/065* (2013.01); *G06F 3/0631* (2013.01); *G06F 3/0679* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 5,594,903 | A * | 1/1997 | Bunnell | G06F 9/4416 713/2 |
| 2005/0091365 | A1 * | 4/2005 | Lowell | G06F 9/45533 709/224 |
| 2006/0184937 | A1 * | 8/2006 | Abels | G06F 8/65 718/1 |
| 2008/0005495 | A1 * | 1/2008 | Lowe | G06F 12/1081 711/152 |
| 2011/0023026 | A1 * | 1/2011 | Oza | G06F 8/63 718/1 |
| 2012/0151118 | A1 * | 6/2012 | Flynn | G06F 11/1008 711/6 |
| 2012/0209895 | A1 * | 8/2012 | He | G06F 8/54 707/825 |
| 2013/0086583 | A1 * | 4/2013 | Uemura | G06F 9/4401 718/1 |
| 2013/0227680 | A1 * | 8/2013 | Pavlyushchik | G06F 21/00 726/21 |
| 2014/0089528 | A1 * | 3/2014 | Bloch | G06F 12/08 710/4 |

(Continued)

*Primary Examiner* — Sean D Rossiter
*Assistant Examiner* — Stephanie Wu
(74) *Attorney, Agent, or Firm* — Angel N. Gerdzhikov; Donna P. Suchy; Daniel M. Barbieri

(57) ABSTRACT

A system and related method for optimizing warm-start loading in a multi-core processing environment (MCPE) responds to a power transient event. The MCPE system memory activates a self-refresh mode, maintaining stored data throughout the power event. A boot loader in nonvolatile flash memory identifies the warm-start condition and fetches from the flash memory the hypervisor binary image. Rather than copy the entire image to allocated system memory, the boot loader copies only the modifiable portions of the hypervisor image, transferring control to the hypervisor. The hypervisor spawns guest processes that copy guest OS and application images from flash memory, copying only the modifiable portions of these images to the appropriate destinations in allocated memory before transferring control to the guest processes. By loading only modifiable image segments and sections, the system reduces the time required for the warm-start sequence.

20 Claims, 2 Drawing Sheets

(56) References Cited

U.S. PATENT DOCUMENTS

| | | | |
|---|---|---|---|
| 2014/0258700 A1* | 9/2014 | England | G06F 21/572 |
| | | | 713/2 |
| 2014/0298317 A1* | 10/2014 | Devine | G06F 8/61 |
| | | | 717/174 |
| 2015/0220455 A1* | 8/2015 | Chen | G06F 12/1408 |
| | | | 711/163 |
| 2015/0248554 A1* | 9/2015 | Dumitru | G06F 21/53 |
| | | | 726/1 |
| 2015/0288659 A1* | 10/2015 | Lukacs | H04L 63/0227 |
| | | | 713/2 |
| 2015/0301850 A1* | 10/2015 | Jeong | G06F 8/63 |
| | | | 718/1 |
| 2016/0283513 A1* | 9/2016 | Antony | G06F 8/61 |
| 2016/0320994 A1* | 11/2016 | Chun | G06F 3/0625 |
| 2016/0328254 A1* | 11/2016 | Ahmed | G06F 9/45558 |
| 2016/0328272 A1* | 11/2016 | Ahmed | G06F 9/4881 |
| 2017/0228245 A1* | 8/2017 | Hardy | G06F 9/45558 |
| 2017/0371749 A1* | 12/2017 | Devitt-Carolan | G06F 11/1469 |

\* cited by examiner

MULTI-CORE OPTIMIZED WARM-START LOADING APPROACH

BACKGROUND

Safety-critical avionics processing systems make increasing use of multi-core processors with embedded hypervisors. The use of a multi-core processing environment (MCPE) allows for the simultaneous hosting of multiple guest operating systems (GOS) across multiple cores, or across multiple partitions of a single processing core. However, the number and size of GOS images required by simultaneous hosting (or of application images of control processes executable on the various cores) may complicate the startup timing requirements of certified avionics processing systems. For example, with respect to a cold start (wherein avionics equipment is booted or powered up after a period of nonuse) instruments powered by a safety-critical system must be operational within 10 to 20 seconds. However, under warm-start conditions involving, e.g., a reboot or restart inflight, safety-critical sensors, control systems, or display systems must resume normal operations immediately (e.g., within a second or a fraction thereof).

SUMMARY

In one aspect, embodiments of the inventive concepts disclosed herein are directed to a system for optimized warm-start loading of a multi-core processing environment (MCPE). The MCPE includes a default core and one or more additional cores; the default core may include a boot loader and a hypervisor configured to execute thereon while the default or additional cores may host additional guest processes (e.g., guest operating systems (GOS) or other applications). The system includes a solid-state non-volatile flash memory couplable to the MCPE, within which the boot loader may be stored. The flash memory may store binary images of the hypervisor, guest operating systems, or other applications. In the event of a power transient event, the system may trigger a self-refresh state in the system memory; if the boot loader detects that data loaded into the system memory is maintained throughout the restart, a warm start may be identified. The system memory may include allocated memory regions dedicated to the hypervisor and to each default and guest operating system. In the event of a warm start, the boot loader may fetch from flash memory the hypervisor binary image, copying only modifiable segments or sections to the appropriate destinations in the system memory allocated to the hypervisor. The boot loader may transfer control to the hypervisor, which spawns guest loaders in each core. The guest loaders fetch guest images from flash memory and copy only the modifiable sections or segments to the corresponding memory allocations in the system memory, transferring control to the various guest processes configured to execute on each core.

In a further aspect, embodiments of the inventive concepts disclosed herein are directed to a processing environment optimized for warm-start loading, which may include a partitioned single processor or processing core or a multi-core processing environment. The processing core may incorporate a hypervisor, boot loader, guest operating system (GOS), or various applications and guest processes configured to execute thereon. A non-volatile flash memory may be couplable to the processing core for storing the boot loader and binary images of the hypervisor, GOS, and guest processes. The processing environment may include a system memory (e.g., RAM) including memory allocations for the hypervisor and each core or partition. In response to a power transient event, the system memory may activate a self-refresh state (when commanded by the boot loader) and maintain data throughout the event, in which case the boot loader may detect warm-start conditions and fetch the hypervisor image from flash memory, copying only modifiable segments or sections to the system memory allocated to the hypervisor and activating the hypervisor. The hypervisor may launch guest loaders on each core or partition, fetching (via the guest loaders) GOS images or application images for each core or partition. The guest loaders copy only the modifiable segments or sections of each GOS/application image to the system memory allocated to each core or partition and activate the respective guest processes.

In a still further aspect, embodiments of the inventive concepts disclosed herein are directed to a method for optimized warm-start loading of a multi-core processing environment (MCPE). The method may include activating a self-refresh state in a system memory of the MCPE. The method may include fetching from a non-volatile storage medium (NVSM) of the MCPE, via a boot loader stored in the NVSM and executing on the MCPE, a binary image of the hypervisor. The method may include copying, via the boot loader, only modifiable sections and segments of the binary image to system memory allocated to the hypervisor. The method may include fetching from the NVSM, via a guest loader spawned by the hypervisor and executing on the MCPE (e.g., on a default or additional core or partition), binary images of a GOS, application, or guest process. The method may include copying, via the guest loader, only modifiable segments or sections of the binary image to system memory allocated to the default or additional core or partition.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
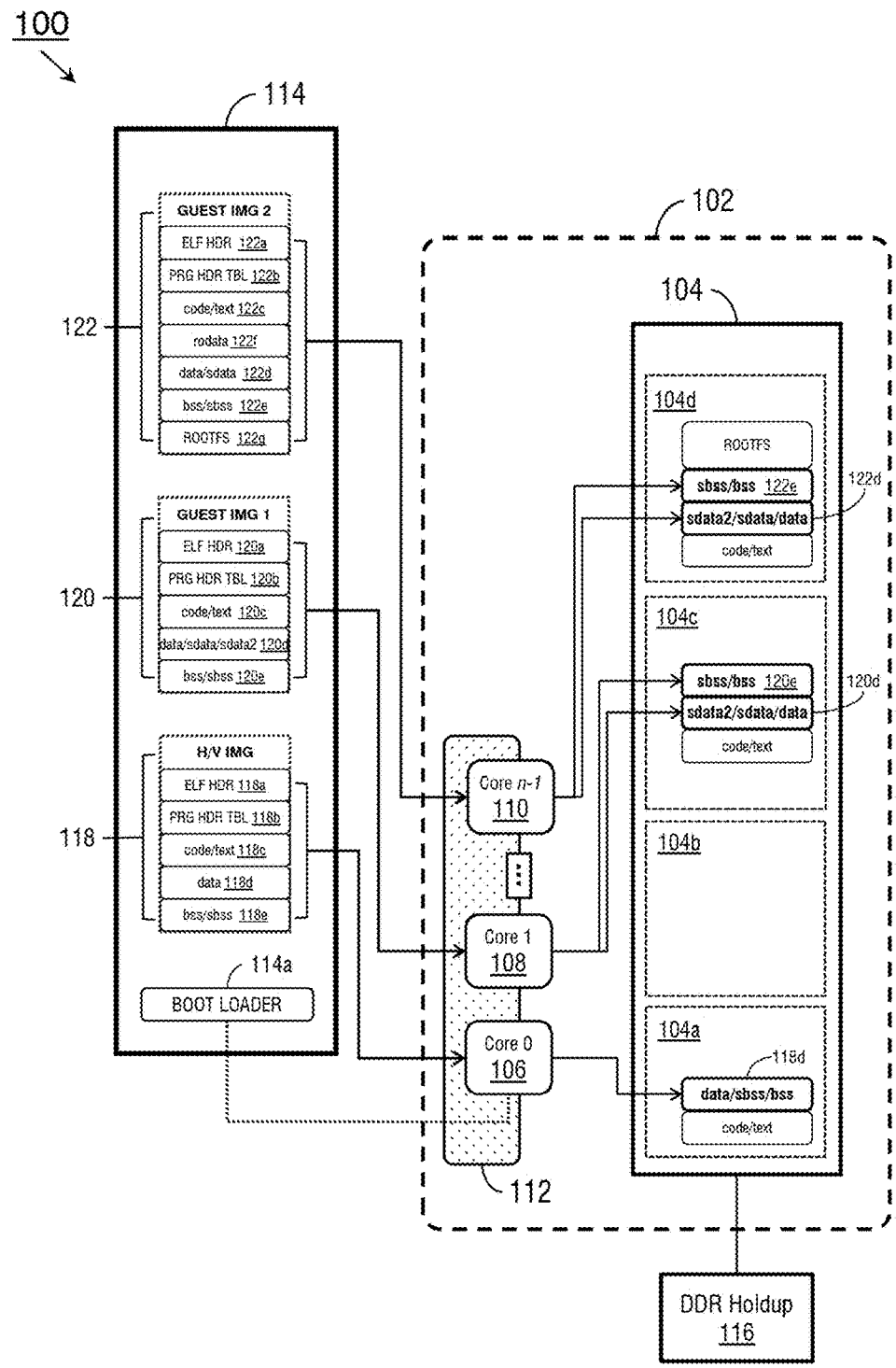
FIG. 1 is a diagrammatic illustration of an exemplary embodiment of a multi-core processing environment (MCPE) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a system, processing environment and related method for optimizing warm-start loading of a multi-core processing environment (MCPE) in response to a power transient event. Rather than reload every binary image in full (the binary images corresponding to the hypervisor, any guest operating systems (GOS) or operating environments executing on the MCPE, and any additional guest processes or applications), the system minimizes the time required for the restart sequence to complete by reloading only modifiable portions of the binary images, as the system memory maintains read-only data throughout the power event.

Referring to FIG. 1, an exemplary embodiment of a system 100 for optimized warm-start loading of an MCPE 102 according to the inventive concepts disclosed herein may include a system memory 104 (e.g., double data rate (DDR) random access memory (RAM)), one or more processing cores 106, 108, 110, a hypervisor 112 configured to execute on the processing cores, and a non-volatile storage medium 114 (NVSM) (e.g., Flash memory). The MCPE 102 may incorporate a single processing core 106 partitioned into one or more processor partitions, e.g., a default partition and one or more guest partitions, or designate one processing core 106 as a default core (e.g., core 0) and the remaining cores 108, 110 as additional cores 1 through n−1 (e.g., for an n-core MCPE). The default core 106 or partition may host, for example, an MCPE health monitor, module operating system (OS), or similar operating environment, while either the default core 106 or the additional cores 108, 110 (or partitions) may host guest operating systems (GOS) or applications (guest processes) configured to execute on the cores or partitions. The system 100 may be embodied, for example, in a display or flight management system (FMS), or in an avionics or vehicle-based processing system.

The system memory 104 may include allocated memory regions 104a-d dedicated respectively to the hypervisor 112 and to each processing core 106, 108, 110 or partition. For example, memory region 104a may be allocated to the hypervisor 112, memory region 104b may be allocated to the default core 106, and memory regions 104c-d may be allocated to the additional cores 108, 110. The system memory 104 may include DDR holdup circuitry 116 configured to maintain data stored to the system memory throughout a power transient event. For example, the DDR holdup circuitry 116 may include capacitors for storing a reserve charge which supplies backup power to the system memory 104 when a power transient event occurs, triggering a self-refresh mode in the system memory. As opposed to a cold-start event, wherein the MCPE 102 is booted or reactivated after a period of non-use, the power transient event may result in a warm start of the MCPE 102, wherein the system memory 104 has activated the self-refresh mode.

The NVSM 114 may store binary images of the hypervisor 112 as well as GOS and other applications executing on the processing cores 106, 108, 110. In addition, the NVSM 114 may include a boot loader (114a) and other executable files configured to execute on the default core 106 for rebooting the MCPE 102 under cold-start or warm-start conditions. For example, the boot loader (114a) may command a controller of the system memory 104 to activate self-refresh mode in response to the power transient event. The boot loader 114a may check the system memory 104 to determine whether data has been maintained throughout the resulting restart. If data has been maintained by the system memory 104 throughout the restart, the boot loader 114a may identify the restart as a warm start. A hypervisor image 118 (and similarly guest images 120, 122) stored on the NVSM 114 may include program executables (e.g., an Executable and Linkable Format (ELF) file) comprising various sections and segments, some read-only and some modifiable. For example, the hypervisor image 118 includes an ELF header 118a, a program/section header table (118b), code segments 118c (e.g., machine instructions), and segments described by the program/section header tables 118b (e.g., data segments 118d or statically allocated variables (bss/sbss segments) 118e). The guest images 120, 122 similarly include ELF headers 120a/122a, program/section header tables 120b/122b, code segments 120c/122c, data segments 120d/122d, and bss/sbss segments 120e/122e. A guest image 122 may additionally include read-only data 122f and root filesystem (e.g., "ROOTFS") data 122g.

When the system memory 104 activates self-refresh mode in response to a power transient event, the boot loader 114a executing on the default core 106 may identify the warm-start condition (based on whether the system memory 104, powered by the holdup circuitry 116, has preserved image data throughout the restart) and commence the warm-start sequence by fetching the hypervisor image 118 from the NVSM 114. The boot loader 114a may determine, e.g., based on segment titles or section headers, which portions of the hypervisor image 118 consist of modifiable segments or sections and which portions consist of read-only segments or sections. As the system memory 104 is in self-refresh mode, and (under warm-start conditions) the system memory has maintained image data stored to the memory allocation (104a) dedicated to the hypervisor 112. Accordingly, there may be no need to reload read-only segments to the system memory 104, and the system 100 may save time by loading only the modifiable portions of the hypervisor image 118. The boot loader 114a may reload the hypervisor image 118 by copying only those segments and/or sections identified as modifiable. For example, the boot loader 114a may reload the data segments 118d and bss/sbss segments 118e, but not the code segments 118c or read-only data, into the memory allocation 104a dedicated to the hypervisor 112. Once the hypervisor image 118 is reloaded to the system memory 104, the boot loader 114a may transfer control of the system 100 to the hypervisor 112, which spawns guest loader processes across each processing core 106, 108, 110 or partition of the MCPE 102.

Each guest loader process may fetch the appropriate guest images from the NVSM 114 for partial reloading to the system memory 104. For example, the guest loader process executing on the additional core 108 may fetch the guest image 120 and determine that the data segments 120d and bss/sbss segments 120e are modifiable while the code segments 120c are not. The guest loader process may copy the modifiable data segments and bss/sbss segments 120d-e to the memory allocation (104c) dedicated to the additional core 108. Similarly, the guest loader process executing on the additional core 110 may fetch the guest image 122 and determine that the data segments 122d and bss/sbss segments 122e are modifiable while the read-only data segments 122f and filesystem data 122g are not modifiable, copying only the data segments and bss/sbss segments (122d-e) to the memory allocation 104d dedicated to the additional core 110. When all guest images 120, 122 have been reloaded to their destinations in the system memory 104, the guest loaders may complete the warm-start sequence by transferring control of the system 100 to the respective guest processes.

Figure 2:
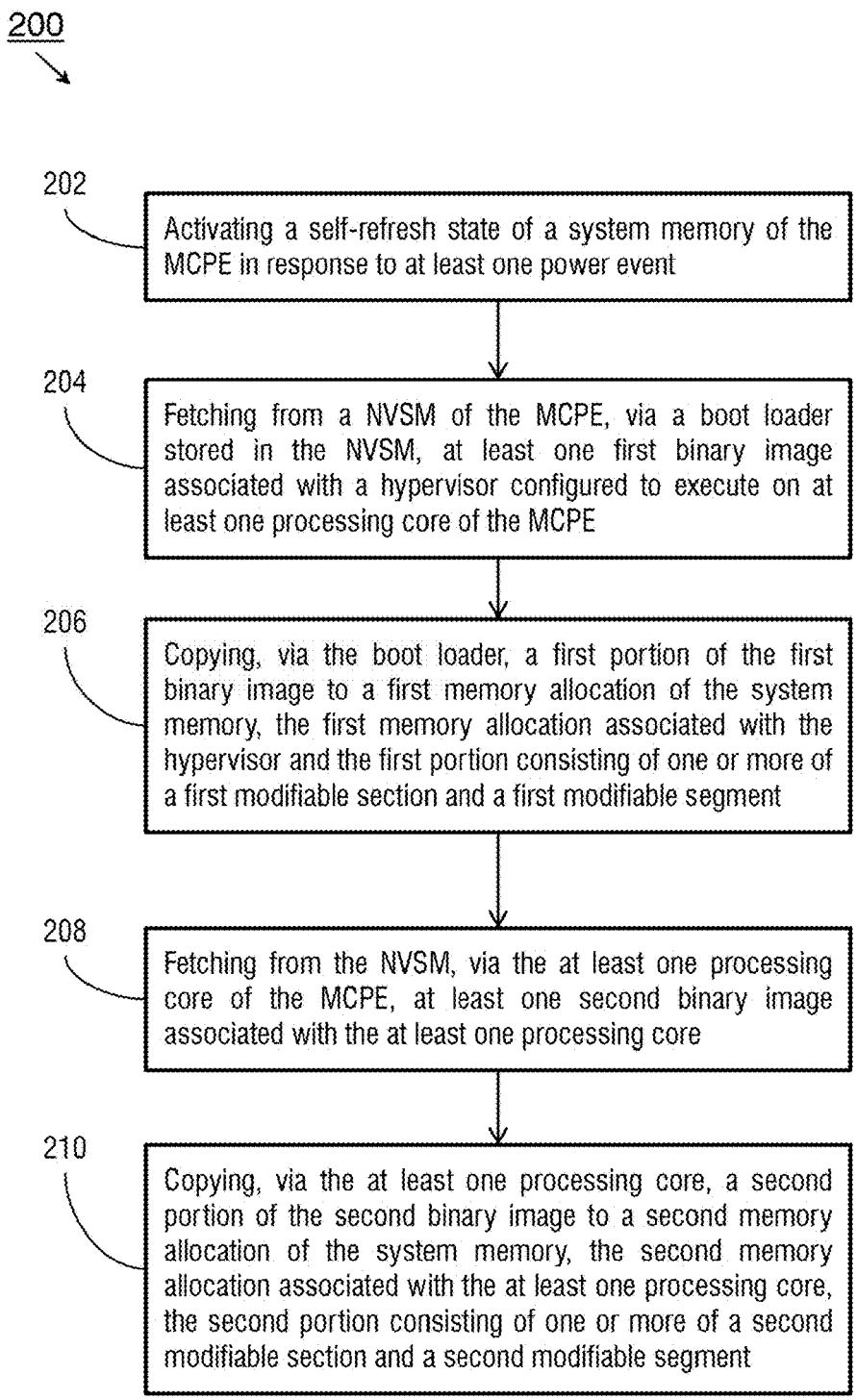
FIG. 2 illustrates an exemplary embodiment of a method for optimizing warm-start loading according to the inventive concepts disclosed herein.

Referring now to FIG. 2, an exemplary embodiment of a method 200 for optimizing warm-start loading in the MCPE according to the inventive concepts disclosed herein may be implemented by the system 100 in some embodiments, and may include method steps 202 through 210.

At the step 202, the system activates a self-refresh mode of the system memory in response to a power transient event. For example, the boot loader stored on the NVSM, and configured to execute on the default core, may detect the power transient event and command the system memory controller to activate self-refresh mode; if the system memory is found to have preserved image data through the restart, a warm start may be identified.

At a step 204, the boot loader fetches from the NVSM the binary image of the hypervisor.

At a step 206, the boot loader copies the modifiable portion of the hypervisor binary image to the system memory allocated to the hypervisor, the modifiable portion consisting of the modifiable segments and modifiable sections of the hypervisor image. For example, the boot loader may copy modifiable data segments, statically allocated variable segments, and other non-read-only segments to the memory allocation.

At a step 208, a processing core or partition (default or additional) fetches a binary image of a GOS, application, or guest process from the NVSM. For example, the hypervisor may spawn guest loader processes on each processing core or partition; the guest loaders may fetch the respective guest images executable on the appropriate core.

At the step 210, the default or additional processing core (or guest loader process configured to execute thereon) copies the modifiable portion of the guest binary image to the appropriate memory allocation in the system memory (e.g., dedicated to the default or additional core or partition), the modifiable portion consisting of the modifiable segments and modifiable sections of the guest image. For example, the guest loaders may copy modifiable data segments and statically allocated variable segments but exclude, e.g., read-only data and code segments.

As will be appreciated from the above, systems and methods according to embodiments of the inventive concepts disclosed herein may optimize the warm-start rebooting process by minimizing the necessary content reloaded to system memory and therefore the time required before the restart sequence completes.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for optimized warm-start loading of a multi-core processing environment (MCPE), comprising:
    one or more processing cores including a default processing core and at least one additional processing core;
    a hypervisor configured to execute on the default processing core;
    at least one guest process configured to execute on the one or more processing cores;
    at least one non-volatile storage medium (NVSM) configured to be coupled to the one or more processing cores, the NVSM configured to store:
        a boot loader configured to execute on the default processing core;
        a first binary image comprising code and data corresponding to the hypervisor; and
        a second binary image associated with one or more of the default processing core, the at least one additional processing core, and the at least one guest process;
    at least one system memory coupled to the one or more processing cores, the system memory configured to activate a self-refresh state responsive to at least one power transient event and comprising:
  a first memory allocation associated with the hypervisor;
  a second memory allocation associated with the default processing core; and
  at least one third memory allocation associated with the at least one additional processing core;
the boot loader configured to, when the self-refresh state is activated:
  fetch the at least one first binary image from the NVSM;
  identify at least one of a first modifiable segment and a first modifiable section of the first binary image based on a segment title and a section header with reference to a program/section header table, as distinguishable from read-only segments and sections and Executable and Linkable Format (ELF) files;
  copy to the first memory allocation a first portion of the at least one first binary image consisting of the at least one of the first modifiable segment and first modifiable section; and
  activate the hypervisor comprising the copied first modifiable segment and first modifiable section;
the hypervisor configured to generate a guest loader configured to execute on each of the one or more processing cores;
the at least one guest loader configured to:
  fetch the at least one second binary image from the NVSM;
  identify at least one of a second modifiable segment and a second modifiable section based on a segment title and a section header with reference to a program/section header table, as distinguishable from read-only segments and sections and ELF files;
  copy to one or more of the second memory allocation and the at least one third memory allocation a second portion of the at least one second binary image consisting of the at least one of the second modifiable segment and second modifiable section; and
  activate the at least one guest process.

2. The system for optimized warm-start loading of claim 1, wherein the at least one second binary image includes at least one of:
  a guest operating system (GOS) image associated with a GOS configured to execute on the one or more processing cores; and
  an application image associated with at least one application configured to execute on the one or more processing cores.

3. The system for optimized warm-start loading of claim 1, further comprising:
  at least one holdup circuit coupled to the system memory and configured to supply reserve power to the system memory in response to the at least one power transient event, the at least one holdup circuit including one or more holdup capacitors configured to store the reserve power.

4. The system for optimized warm-start loading of claim 1, wherein the at least one NVSM includes a flash memory.

5. The system for optimized warm-start loading of claim 1, wherein:
  the first portion includes at least one of a first data segment and a first statically allocated variable segment; and the second portion includes at least one of a second data segment and a second statically allocated variable segment.

6. The system for optimized warm-start loading of claim 1, wherein:
  at least one of the first portion and the second portion excludes one or more of machine instructions, read-only data, and filesystem data.

7. The system for optimized warm-start loading of claim 1, wherein the system is embodied in at least one of an avionics processing system and an avionics display system.

8. A processing environment optimized for warm-start loading, comprising:
  a processing core;
  a hypervisor configured to execute on the processing core;
  at least one guest process configured to execute on the processing core;
  at least one non-volatile storage medium (NVSM) configured to be coupled to the processing core, the at least one NVSM configured to store:
    a boot loader configured to execute on the processing core;
    a first binary image comprising code and data corresponding to the hypervisor; and
    a second binary image associated with one or more of the processing core and the at least one guest process;
  at least one system memory coupled to the processing environment, the at least one system memory configured to activate a self-refresh state in response to at least one power transient event and comprising:
    a first memory allocation associated with the hypervisor; and
    at least one second memory allocation associated with the processing core;
  the boot loader configured to, when the self-refresh state is activated:
    fetch the first binary image from the at least one NVSM;
    identify at least one of a first modifiable segment and a first modifiable section of the first binary image based on a segment title and a section header with reference to a program/section header table, as distinguishable from read-only segments and sections and Executable and Linkable Format (ELF) files;
    copy to the first memory allocation a first portion of the first binary image consisting of the at least one of the first modifiable segment and first modifiable section; and
    activate the hypervisor comprising the copied first modifiable segment and first modifiable section;
  the hypervisor configured to:
    fetch the at least one second binary image from the at least one NVSM;
    copy to the at least one second memory allocation a second portion of the at least one second binary image, the second portion consisting of at least one of a second modifiable segment and a second modifiable section; and
    activate the at least one guest process.

9. The processing environment of claim 8, wherein the processing core is a default processing core and the processing environment is a multi-core processor environment (MCPE) further comprising:

at least one additional processing core, the at least one guest process configured to execute on one or more of the default processing core and the at least one additional processing core;

the at least one second binary image associated with one or more of the default processing core, the at least one additional processing core, and the at least one guest process;

the at least one system memory further comprising at least one third memory allocation associated with the at least one additional processing core;

and wherein the hypervisor is configured to:
 generate at least one guest loader process configured to execute on each of the default processing core and the at least one additional processing core;
 fetch the at least one second binary image via the at least one guest loader process; and
 copy the at least one second portion to one or more of the at least one second memory allocation and the at least one third memory allocation via the at least one guest loader process.

10. The processing environment of claim 9, wherein the at least one second binary image includes one or more of:
 a guest operating system (GOS) image associated with a GOS configured to execute on one or more of the default processing core and the at least one additional processing core; and
 an application image associated with at least one application configured to execute on one or more of the default processing core and the at least one additional processing core.

11. The processing environment of claim 8, wherein the at least one NVSM includes a flash memory.

12. The processing environment of claim 8, wherein:
 the at least one first portion includes one or more of a first data segment and a first statically allocated variable segment; and
 the at least one second portion includes one or more of a second data segment and a second statically allocated variable segment.

13. The processing environment of claim 8, wherein at least one of the first portion and the second portion excludes one or more of machine instructions, read-only data, and filesystem data.

14. The processing environment of claim 8, further comprising:
 at least one holdup circuit coupled to the system memory and configured to supply reserve power to the system memory in response to the at least one power transient event, the at least one holdup circuit including one or more holdup capacitors configured to store the reserve power.

15. The processing environment of claim 8, wherein:
 the processing environment corresponds to a processor incorporating one or more processor partitions;
 the hypervisor and the boot loader are configured to execute on a first processor partition; and
 the at least one guest process is configured to execute on at least one second processor partition.

16. A method for optimizing warm-start loading of a multi-core processing environment (MCPE), the method comprising:
 activating a self-refresh state of a system memory of the MCPE in response to at least one power transient event;
 fetching from a non-volatile storage medium (NVSM) of the MCPE, via a boot loader stored in the NVSM, at least one first binary image comprising code and data corresponding to a hypervisor configured to execute on at least one processing core of the MCPE;
 identifying, via the boot loader, at least one of a first modifiable segment and a first modifiable section of the first binary image based on a segment title and a section header with reference to a program/section header table, as distinguishable from read-only segments and sections and Executable and Linkable Format (ELF) files;
 copying, via the boot loader, a first portion of the first binary image to a first memory allocation of the system memory, the first memory allocation associated with the hypervisor and the first portion consisting of one or more of the first modifiable section and the first modifiable segment;
 fetching from the NVSM, via the at least one processing core, at least one second binary image associated with the at least one processing core;
 identifying, via the at least one processing core, at least one of a second modifiable segment and a second modifiable section based on a segment title and a section header with reference to a program/section header table, as distinguishable from read-only segments and sections and ELF files; and
 copying, via the at least one processing core, a second portion of the second binary image to a second memory allocation of the system memory, the second memory allocation associated with the at least one processing core, the second portion consisting of one or more of the second modifiable section and the second modifiable segment.

17. The method of claim 16, wherein fetching from the NVSM, via the at least one processing core, at least one second binary image associated with the at least one processing core includes:
 generating, via the hypervisor, at least one guest loader configured to execute on the at least one processing core; and
 fetching from the NVSM, via the at least one guest loader, the at least one second binary image.

18. The method of claim 17, wherein copying, via the at least one processing core, a second portion of the second binary image to a second memory allocation of the system memory, the second memory allocation associated with the at least one processing core, the second portion consisting of one or more of a second modifiable section and a second modifiable segment, includes:
 copying, via the at least one guest loader, the at least one second portion to the second memory allocation.

19. The method of claim 16, wherein copying, via the boot loader, a first portion of the first binary image to a first memory allocation of the system memory, the first memory allocation associated with the hypervisor and the first portion consisting of one or more of a first modifiable section and a first modifiable segment includes:
 copying, via the boot loader, at least one of a first data segment and a first statically allocated variable segment to a first memory allocation of the system memory.

20. The method of claim 16, wherein copying, via the at least one processing core, a second portion of the second binary image to a second memory allocation of the system memory, the second memory allocation associated with the at least one processing core, the second portion consisting of one or more of a second modifiable section and a second modifiable segment includes:
 copying, via the at least one processing core, at least one of a second data segment and a second statically allocated variable segment to a second memory allocation of the system memory.

* * * * *